INVENTOR
Alda V. Bedford
BY
[signature]
ATTORNEY

INVENTOR
Alda V. Bedford
BY
[signature]
ATTORNEY

INVENTOR
Alda V. Bedford
BY
[signature]
ATTORNEY

INVENTOR
Alda V. Bedford
BY [signature]
ATTORNEY

INVENTOR
Alda V. Bedford
BY
[signature]
ATTORNEY

May 4, 1954 A. V. BEDFORD 2,677,721

COLOR TELEVISION SYSTEM

Filed Sept. 24, 1949 6 Sheets-Sheet 6

INVENTOR
Alda V. Bedford
BY
[signature]
ATTORNEY

Patented May 4, 1954 2,677,721

UNITED STATES PATENT OFFICE 2,677,721

COLOR TELEVISION SYSTEM

Alda V. Bedford, Princeton, N. J., assignor to Radio Corporation of America, a corporation of Delaware Application September 24, 1949, Serial No. 117,618

19 Claims. (Cl. 178—5.2)

The present invention relates to improvements in the methods and apparatus of time multiplexed signal communication systems and more particularly, although not necessarily exclusively, to improvements in time multiplexing methods and arrangements for transmitting and receiving time division multiplexed color television signals.

More directly, the present invention deals with improved techniques and apparatus for receiving time division multiplexed color television signals of a character produced by the novel color television transmission system described in my co-pending U. S. patent application, Serial No. 117,368, entitled "Color Television System," filed September 23, 1949.

There have in the past been proposed a variety of methods and arrangements for transmitting and receiving color television image information. In most of these systems, with particular reference to the tri-color variety in which three additive primary color impressions are utilized, an effort has been extended to reduce the required bandwidth under that normally required for three separate standard black and white television channels, while retaining an effective image definition comparable to that obtainable in a black and white system. More recent considerations of the commercial aspects of color television have, however, indicated the desirability of providing a composite color television signal which when subjected to radio transmission demands a channel width not in excess of the present 6 mc. width allotted to standard black and white television transmission, including of course the accompanying sound. In addition, it is considered almost necessary that to be acceptable the techniques of the color transmission and reception be compatible with existing standard black and white television receivers. That is to say, the transmitted color signal should be receivable by standard black and white receivers to produce a satisfactory panchromatic type image. Vice versa, the color transmission receiving techniques should be such as to provide a suitable black and white image when receiving a standard black and white television signal.

However, as pointed out in my above-mentioned co-pending U. S. patent application, it has been believed that restriction of color transmission to a 4.2 mc. video channel would demand considerable sacrifice in color picture definition. To increase color television image definition, certain time division multiplexing signal arrangements have been proposed. By way of example, in the basic form of time multiplexing arrangement, there is generally established at the transmitter station three separate color channels, each fed by the output of a separate color camera. Each color camera is in turn made responsive to a different one of three additively primary color components of the color image to be transmitted. A commutating or electrical sampling mechanism is then provided for sequentially sampling the individual outputs of these three color channels at some predetermined sampling rate. The output of the sampling mechanism therefore comprises a series of pulses divisible into groups of three, the amplitude variation of each pulse of a given group, of course, corresponding to the light intensity variations of the color component it represents. The most basic color television receiving apparatus for this system is the inverse of the transmitter in its operation. After the series of multiplex pulses are demodulated from the transmitter carrier, they are applied to a commutator or signal sampling circuit substantially the same as that employed in the transmitter. The receiver commutator is then held in synchronism with the transmitter commutator so that it provides at each of three separate output terminals pulses corresponding to only one particular transmitter color channel. Three receiver color channels each terminating, for example, in a kinescope, are then respectively fed by a suitable group of the separated color pulses provided by the receiver commutator. The images on the three kinescopes are given suitable color hues by the use of a suitable phosphor or by filters corresponding to the three colors of the transmitter channels. The monochrome color records thus produced are then optically combined with one another to form a complete television color image.

It has been proposed to provide means for reducing the image repetition rate and horizontally interlacing the primary color elements of the color image along each line of the color image raster to reduce the apparent flicker of the lower image repetition rate. With such a system, as described more fully in a co-pending application by Randall Ballard, Serial No. 117,528, entitled "Color Television System," filed September 24, 1949, the degree of visual picture detail may within limits be virtually multiplexed by the number of times an individual line is interlaced. For instance, in a time multiplexed tri-color television system not employing interlacing along the lines but utilizing a channel sampling or commutating rate of 2 mc. for each color, while the bandwidth of each channel sampled is 4 mc., the effective definition of the reproduced color image would be restricted to 1 mc. for a frame presentation rate of 30 complete color frames per second. If, however, the individual color elements of the tri-color system are interlaced along the horizontal lines making up the color image raster on a two-to-one basis, the effective visual definition of the color image will be increased to 2 mc. while frame presentation rate will be reduced to 15 complete color frames per second thereby decreasing the flicker rate.

In my above-referenced U. S. patent application, Serial No. 117,368, entitled "Color Television System," filed September 23, 1949, I have shown an improved method and apparatus for increasing the effective image resolution in a time multiplexed color television system such that the elemental sequential formation of the color television image will display a visual definition equivalent to color signal components having frequencies substantially above half the sampling rate of the time multiplexing system.

In accomplishing this increase in image resolution, my above referenced co-pending U. S. patent application, describes transmission systems employing the division of the individual color signals of the time multiplexing system into low and high frequency components and restricting the sequential sampling of the channels to only the low frequency components thus provided. The high frequency components of the channels are then utilized to form a signal, which was in the above referenced patent application and will hereinafter be called a picture-detail signal. This picture-detail signal is then, in effect, made to by-pass the signal sampling process. By this by-passing technique, the higher signal frequencies defining the detail of the reproduced color picture or image are not deleteriously influenced by the time multiplexing sampling of the color channels. The resulting picture detail from the high frequency components of one or more of the color signal channels act to quite faithfully depict the picture detail in all of the color channels in accordance with the principles more exhaustively explained in my U. S. Patent 2,554,693, entitled "Simultaneous Multicolor Television," filed December 7, 1946, in which it is pointed out that the color sensitivity of the human eye is reduced when viewing the small areas of illumination defining television picture detail and that the picture detail transmitted by the high frequency components is part of a black and white monochrome signal which will be a measure of image brightness, although not its color which is derived from the sampled low frequencies.

Although time multiplexed transmission in accordance with my above-referenced U. S. patent application, Serial No. 117,368, entitled "Color Television System," filed September 23, 1949, provides advantages when used in connection with conventional forms of basic time division multiplexed receiving circuits, still further striking improvements in color picture quality may be realized if a suitable separation of the picture-detail signal from the composite color signal is effected in the receiving apparatus and the picture-detail signal so separated channeled to again avoid commutation by the time division multiplexing commutator.

It is therefore an object of the present invention to provide an improved method and apparatus for transmitting and receiving and utilizing time multiplexed signals in electrical systems.

It is a still further object of the present invention to provide an improved method and apparatus for receiving and reproducing color television images from time division multiplexed signals as produced in accordance with my above-referenced co-pending U. S. patent application, Serial No. 117,368, entitled "Color Television System."

It is still further an object of the present invention to provide a method and apparatus for improving the effective picture definition in color television images produced by reduced bandwidth color television receiving systems.

A still further object of the present invention resides in the provision of an improved method and apparatus for reducing the visible evidence of signal commutation, normally referred to as dot-structure, in time division multiplexed color television systems.

Another object of the present invention is to provide an improved method and apparatus for receiving and reproducing color television images of higher light intensity than heretofore permitted under given conditions of kinescope operation.

In the realization of the above objects, the present invention contemplates the use of a color television signal receiving apparatus suitable for receiving and demodulating a time division multiplexed color signal as produced in accordance with my co-pending U. S. patent application, Serial No. 117,368, entitled "Color Television System," filed September 23, 1949. The time multiplexed signal thereby received is then applied to a signal distributing circuit which periodically, and in synchronism with the transmitter signal sampling mechanism, applies the incoming signals to three receiver color channels such as to apply to each of the receiver color channels only those pulses whose amplitude variations correspond to intensity variations of the color represented by the channel. The frequency of each color channel is then limited to a value well below the commutation rate of the time division multiplexed system. High frequency or picture-detail components of the received time multiplexed signal are then selected by a suitable filter circuit and by means of one or more signal adding circuits the high frequency picture-detail signal so selected is combined with the output of one or more of the receiver color channels. In this way, the picture-detail component of the composite time multiplexed color television signal is effectively by-passed around the receiver signal distributing system so that the commutative action of the signal distributing system can in no way affect the high definition detail of the color image. The reduction in dot structure thus produced allows an increase in permissible average picture brightness as well as improving the faithfulness with which picture detail is presented.

A more complete understanding of the operation of the present invention, as well as other objects and features of advantages thereof, will be gleaned from a perusal of the following specification especially when taken in connection with the accompanying drawings in which.

Figures 5, 6, 7:
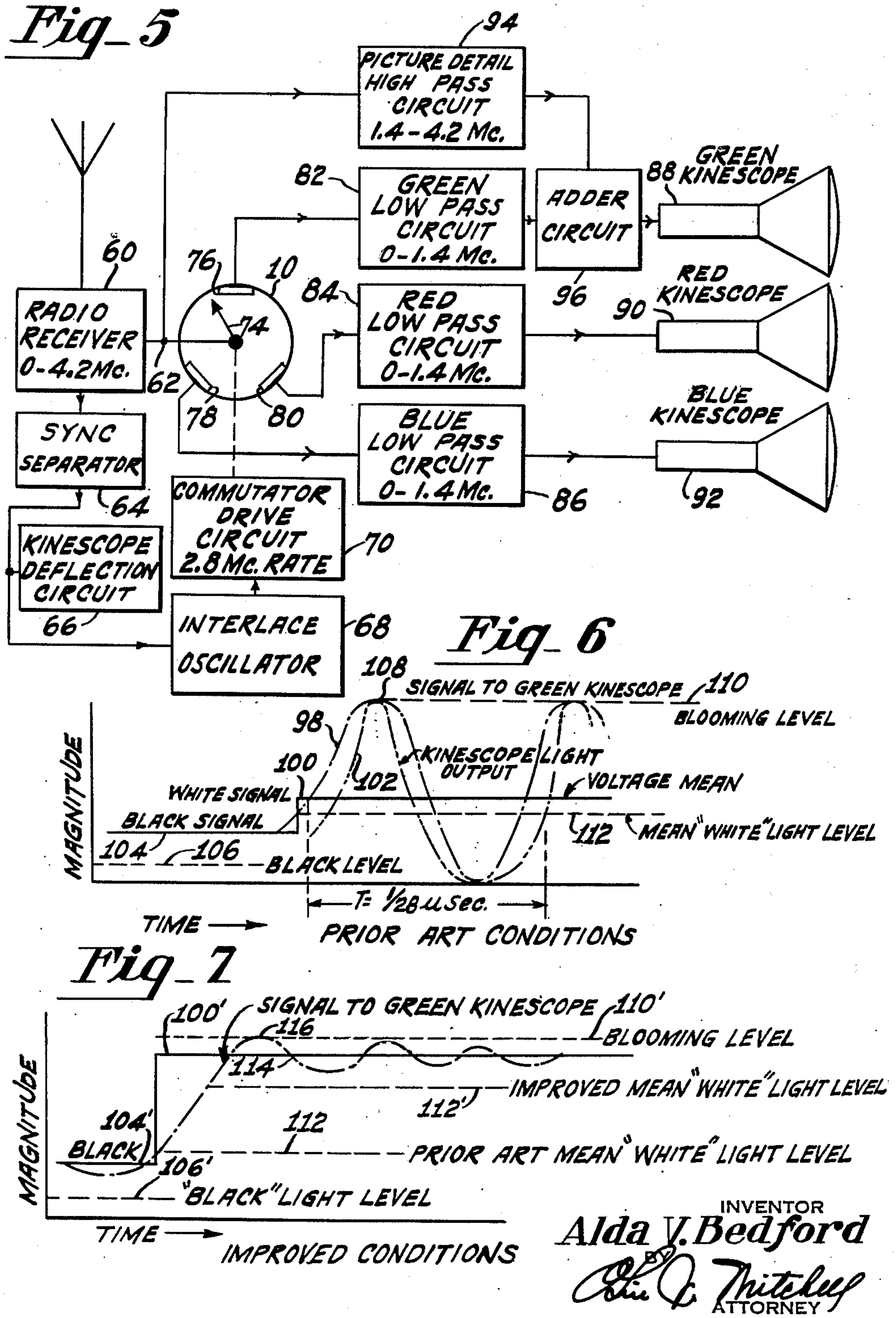
Figure 5 illustrates by block diagram one form of the present invention as applied to a time multiplexed color television receiver embodying the novel features of the present invention.
Figure 8:
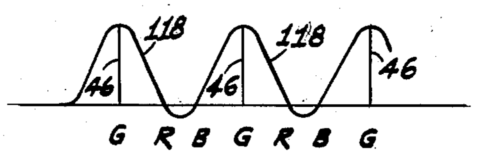
Figure 9:
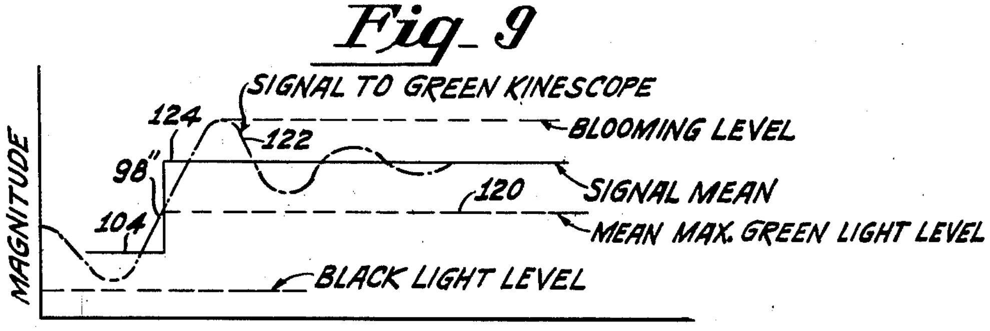
Figure 10:
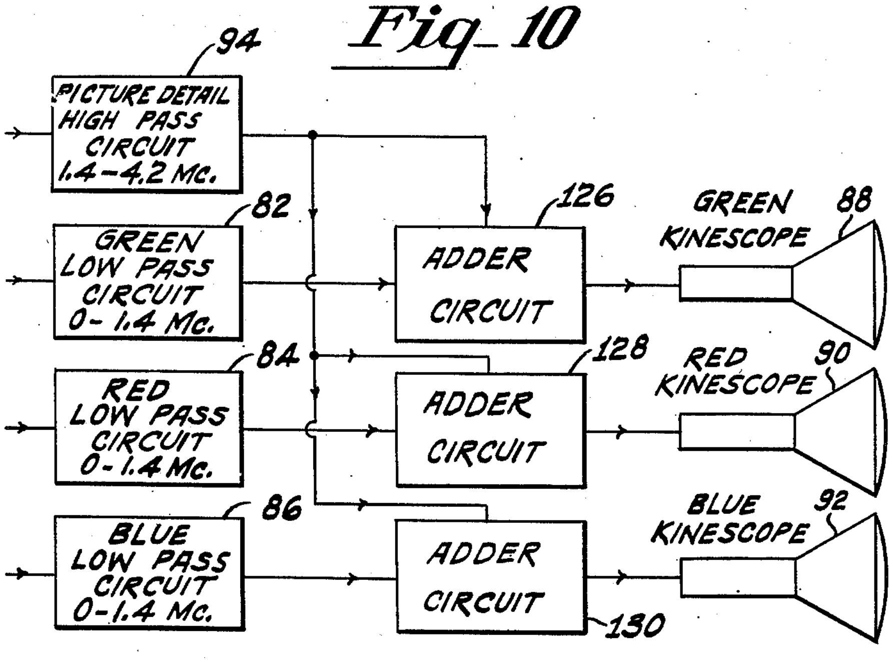
Figure 11:
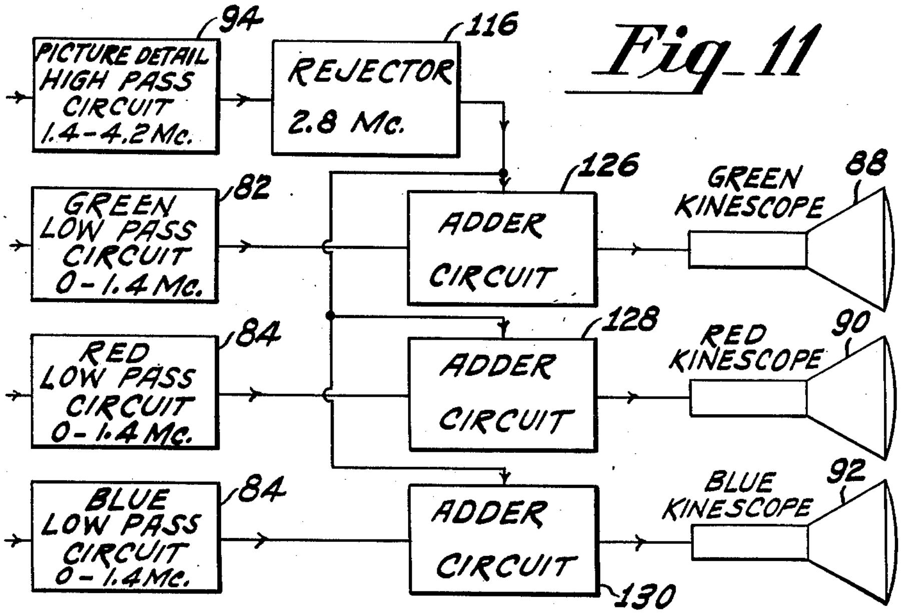
Figure 12:
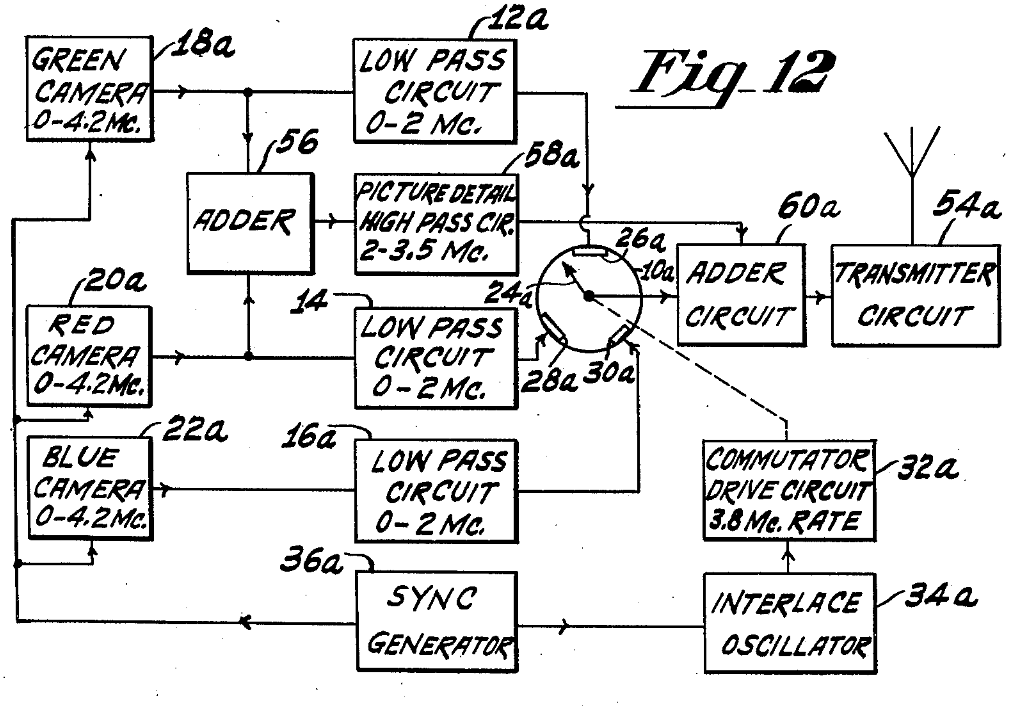

Figure 6 graphically represents certain inherent characteristics of prior art systems for receiving time division multiplexed color television signals;

Figure 7 graphically represents some of the improved characteristics obtainable through the use of the present invention as shown, for example, by the arrangement of Figure 5;

Figure 8 illustrates certain signal conditions found in operation of the arrangement of Figure 5;

Figure 9 is a still further graphic representation of electrical signals encountered in the practice of the present invention illustrated in Figure 5;

Figure 10 shows in block form a modification of the embodiment illustrated in Figure 5;

Figure 11 shows a still further modification of the embodiment of the present invention as illustrated in Figure 5;

Figure 12 illustrates another form of time multiplexed television transmitter useful in the practice of the present invention, but of the general form described more fully in my above-referenced U. S. patent application, Serial No. 117,368; and Figure 13 indicates in block form a suitable time multiplexed color television receiving apparatus embodying the present invention and designated for use with the color television signal produced by the color television transmitter of Figure 12.

Before considering the novel aspects of the present invention in full detail, an understanding of the nature of the television signal with which the receiving apparatus is primarily intended to operate is best obtained. For this purpose, there has been shown in Figure 1 the novel time division multiplexed color television transmission system described in my above-referenced U. S. patent application, Serial No. 117,368. Time division multiplexing involves channel selection and in this system there is provided channel selector apparatus, i. e. a signal sampling or commutating device represented by the symbol 10, well known to those skilled in the art, adapted for sequentially sampling the output of three color signal channels 12, 14, and 16 respectively fed by the outputs of green, red, and blue color cameras 18, 20, and 22. Symbolically, the sampling device 10 is shown as provided with a rotating armature 24 which, as it rotates, electrically contacts the terminals 26, 28, and 30, each bearing respective signals from the green, red, and blue camera channels. The frequency at which the commutation of sampling or selection of the color cameras takes place is determined by the commutator drive circuit 32. The drive circuit 32 is in turn, through the agency of an interlacing oscillator 34, whose function is later to be described, synchronously controlled by the television system sync generator 36 in order to hold all elements of the television system in synchronism with one another. The sync generator 36 is further adapted via path 38 to apply synchronous control to the red, blue and green cameras 18, 20, and 22. By way of example, the commutator drive circuit has been indicated as effecting a sampling rate of 2.8 mc. for each color. This sampling or commutation rate is not in any way critical but may assume a variety of values, that which is indicated being illustrative of only one value permissibly employed.

Figure 4:
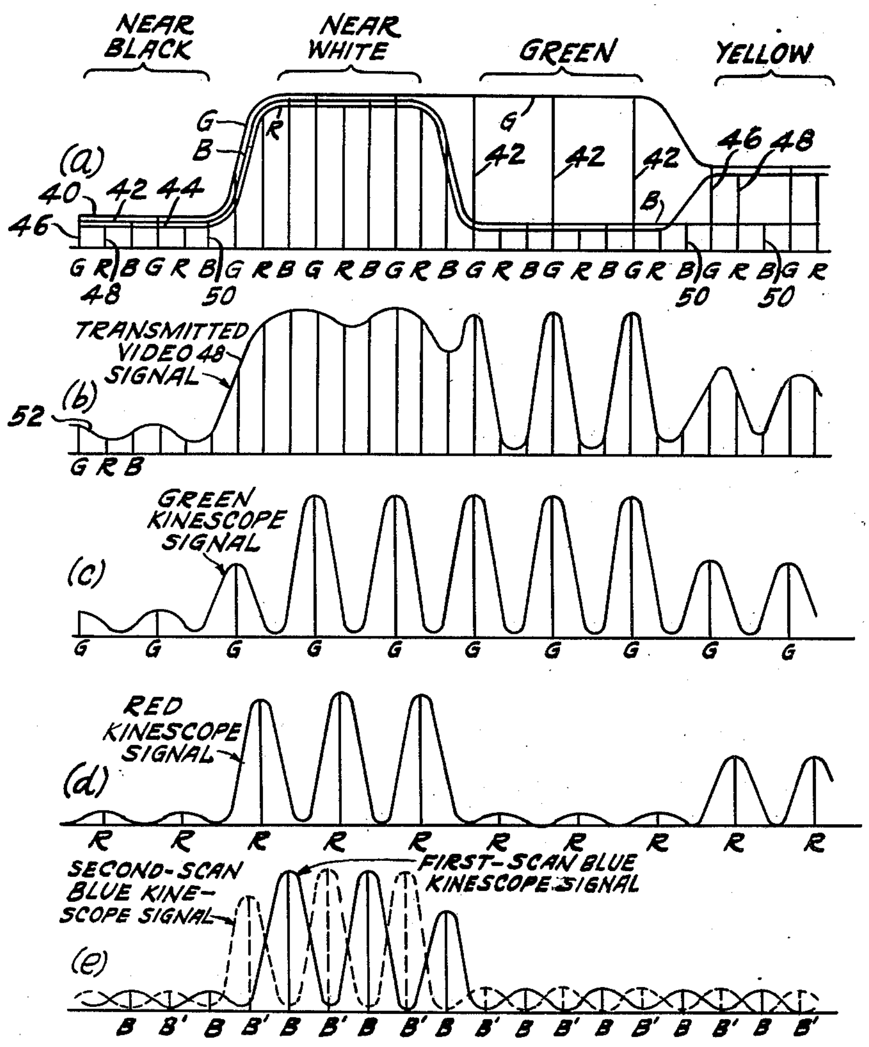
Figure 4 illustrates certain waveform characteristics of the television signal transmitted by the transmitter of Figure 1.

Assuming then the appearance of green, red, and blue color signals at the terminals 26, 28, and 30 of the sampling device 10, the output available at the armature 24 will comprise a plurality of pulses having a recurrence frequency of three times that of the 2.8 mc. sampling rate or 8.4 mc. In Figure 4*a*, there are illustrated by the curves 40, 42, and 44 respectively the video signals appearing at the terminals 26, 28, and 30 of the commutator 10 under the conditions of a camera pick up of a near black color area, a near white color area, a green color area, and a yellow color area as scanned by the green, red, and blue cameras 18, 20, and 22. The commutator armature 24 will then sequentially sample the signals appearing at the terminals 26, 28, and 30 during the intervals corresponding to the pulses 46, 48, and 50, which sampling provides pulsed color information at those terminals of the commutator corresponding to the green, red, and blue channels.

The amplitude of the pulses delivered by the commutator will therefore be defined by the actual amplitude of the signal appearing at the terminal being sampled. For sake of convenience, all of the green sampling pulses 46, whose peak amplitude is defined by the green signal 40 applied to terminal 26 of the commutator, is designated by the letter G. The red and blue pulses 48 and 50, whose amplitude is defined by the signal curves 42 and 44 respectively, are correspondingly designated as R and B pulses. Thus, for near black signals all of the green, red and blue components, as shown, will have a very low amplitude so that the amplitudes of the G, R, and B sampling pulses will be correspondingly low. The curve in Figure 4*b* illustrates the actual appearance of the sampling pulses at the output of the commutator 10. The curve 52 of Figure 4*b*, connecting the peaks of the green, red, and blue pulses, of course, indicates the envelope of the transmitted video signal. For a near white signal where the green, red, and blue components are relatively high, all of the green, red, and blue sampling pulses will of course increase proportionately. For a green signal, the amplitude of the red and blue components will drop considerably to leave a preponderance of high amplitude green pulses 46. Correspondingly, for a yellow signal, the amplitude of the blue sampling pulses 50 will drop leaving a preponderance of green and red pulses 46 and 48 respectively. The waveform in Figure 4*b* defined by these pulses will form the basic signal transmitted by the transmitter 54. However, according to the novel transmitter arrangement shown in Figure 1, described in my above-referenced U. S. patent application, Serial No. 117,368, entitled "Color Television System," filed September 23, 1949, the outputs of a plurality of the color cameras, and in the case of Figure 1 all of the color cameras, are applied to an adder circuit 56 which additively combines all of the color signals together and applies them to a picture-detail high pass circuit 58. The output of the picture-detail high pass circuit 58 is then added to the modulating signal applied to the transmitter 54 from the commutator 10 by means of the adder circuit 59.

As pointed out hereinabove, this transmitter arrangement allows the high frequency components of the color image to by-pass the commutator 10 thereby obviating the production of any deleterious signal components produced through a heterodyne between the sampling rate of the commutator 32 and the higher frequency components of the color signals. Correspondingly, the color channels 12, 14, and 16 are given low pass characteristics whose highest pass frequency is equal to the lowest pass frequency of the picture-detail high pass circuit. Since it is well known that the pulse rate of a time division multiplexed channel should, if cross-talk is to be avoided, not be greater than twice the band width of the communication channel, it is evident that the sampling rate of the commutator 10 must necessarily be held to $\frac{1}{3}\times2\times4.2$ mc.=2.8 mc., where 4.2 mc. is the upper limit of the video bandpass provided by the transmitter 54. Since it is further well known in the electrical art that the highest frequency faithfully reproducable over a given channel of a simple time division multiplexing system is not in excess of one-half the frequency at which that given channel is sampled, there is no need for extending the pass characteristics of the channels 12, 14, and 16 beyond half the established 2.8 mc. sampling rate or 1.4 mc. This therefore determines that the picture-detail high pass circuit 58 may pass signals falling in the range of 1.4 mc. to 4.2 mc., the upper limit of this band being in turn defined by the upper limit of the transmitter pass band which, as hereinbefore brought out, is conventionally established at 4.2 mc. With the arrangement shown, the modulation envelope of the transmitted video signal will therefore appear substantially as shown in Figure 4*b* with, of course, the exception that the high frequency picture-detail signal will be transmitted at all times regardless of the commutation action of the commutator 10.

Figure 1:
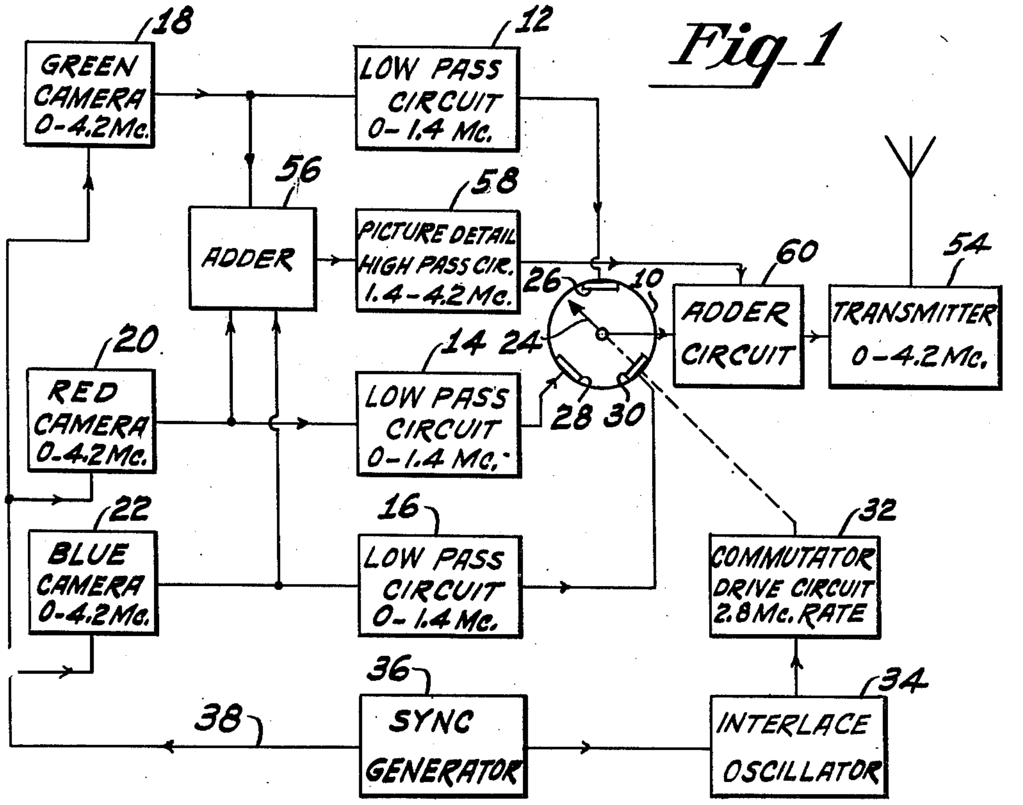
Figure 1 illustrates one form of my improved television transmission system as shown in my above-referenced U. S. patent application, Serial No. 117,368, entitled "Color Television System," filed September 23, 1949, the generated signals of which are found particularly suited for use in connection with the present invention.

In Figure 5, there is shown a receiving system for receiving the transmitted signal of the transmitter in Figure 1. In accordance with prior art proposals, a conventional radio receiver 60 is provided for receiving and demodulating the transmitted color television carrier. The demodulated video signal, which will be substantially the same as the curve shown in Figure 4*b*, except that the high frequency detail is not shown therein, will therefore appear at the output terminal 62 of the receiver 60. A conventional sync separator circuit 64, kinescope deflection circuit 66, as well as an interlace oscillator 68, and drive circuit 70 for the receiver commutator 72, are also provided for operation from the output derived from the receiver 60. In further accordance with prior art proposals, the commutator 72 symbolically represents a signal distributing system substantially the same as the arrangement 10 in Figure 1 and is indicated as having a contactor or armature 74 which rotatingly and successively contacts the terminals 76, 78, and 80. The rotation of the armature 74, through the action of the commutator drive circuit 70 and interlace oscillator 68, the oscillator being in turn controlled by the output of the sync separator 64, is held in exact synchronism with the armature 74 of the commutator 10 in Figure 1. Thus, when a green pulse is being commutated for transmission by the commutator 10 in Figure 1, the armature 74 will be in position for distribution of this pulse to the terminal 76 of the receiver commutator 72. Likewise, the red and blue pulses will be distributed to the terminals 78 and 80 of the receiver commutator 72.

According to the present invention, however, the outputs of the commutative distributor 72 appearing at its terminals 76, 78, and 80 are respectively applied to low pass signal channels containing circuits 82, 84, and 86 whose cut off frequency is made identical to the cut off frequency of the low pass circuits 12, 14 and 16 of the transmitter. This prevents high frequency signal components from being directly communicated by these respective green, red, and blue low pass circuits to the green, red, and blue image reproducing tubes or kinescopes 88, 90, and 92.

Accordingly, the high frequency picture-detail signal transmitted by the transmitter in Figure 1 is in further accord with the present invention selected at the output of the receiver 60 by the picture-detail high pass filter circuit 94 whose output may be combined with one or more of the receiver color channels 82, 84, and 86. In Figure 5 the output of the picture-detail high pass filter circuit 94 is indicated as being added to only the output of the green channel 82 of the receiver by means of the adder circuit 96. As in the case of the transmitter in Figure 1, the picture-detail high pass circuit is given a bandpass characteristic whose lower frequency limit begins at the upper frequency cut off of the individual green, red and blue color channels. The upper frequency cut off of the picture-detail high pass filter circuit 94 of course need be no greater than the 4.2 mc. bandwidth of the transmitter 54.

In order to more fully appreciate the advantages of the novel receiving system provided by the present invention shown in Figure 5, there is illustrated in Figure 6 the electrical signal conditions which would obtain in prior art receiving systems wherein both the novel by-passing of the picture-detail high frequencies, through the agency of the high pass filter circuit 94, and the frequency restriction of the individual green, red, and blue channels are removed. In such a prior art arrangement, and considering the output of the receiver green channel under conditions corresponding to a change from a black to white level in the color scansion of a black and white subject, there is manifestly produced a rather high amplitude 2.8 mc. sinusoidal component 98. This sinusoidal component 98 appearing in the output of the green channel 82 comes about by way of the fact that the signal in the channel 82 under such conditions comprises nothing more than a series of pulses whose amplitude during the white signal level 100 will remain substantially constant as illustrated in Figure 4*a* and in particularity in Figure 4*c*. The curve 102 drawn on the same coordinants as the green kinescope voltage 98 represents the light output variation of the kinescope for this input voltage 98. For purposes of reference the light level of the kinescope 88 for a black signal level 104, is shown by the dashed line at 106. It can then be seen that the peaks 108 of the signal 98 applied to the green kinescope will produce peaks of light, as shown by curve 102, which are quite sharp and of short duration. These peaks will, in practice, correspond to high intensity dots along the raster lines defining the image on the kinescope. These points of high illumination or dots will be spaced at equal intervals based upon the period of the 2.8 mc. sampling rate, and will constitute an easily visible and undesirable dot pattern over the face of the kinescope. Furthermore, it can be seen that if blooming of the kinescope 88 commences at some signal level such as 110 in Figure 6, and high definition in the image is to be realized, the peak amplitude 108 of the signal 98 applied to the kinescope must necessarily be held to a value not in excess of this blooming level. Since the kinescope light output curve 102 does not effectively follow the sinusoidal variations of the applied signal 98 due to the non-linear gamma characteristics of kinescopes in general, the maximum mean light level for the green kinescope, under the conditions of a white signal, may be indicated by the dashed line 112, which level is considerably below the blooming level 110 of the green kinescope.

However, with the picture-detail high pass circuit 94 connected to by-pass the commutator 72 and with the green, red and blue channels 82, 84, and 86 restricted to 1.4 mc. as provided by the present invention, a considerable improvement in operating efficiency and picture quality may be obtained. This improvement is shown in Figure 7 in contradistinction to the prior art conditions illustrated in Figure 6. Again consideration is given to the signal 98′ delivered to the green kinescope 88 under the conditions of a change from a black signal level 104′ to a white signal level 100′. It can be seen in Figure 7 that the rather high amplitude sinusoidal component of the signal 98 in Figure 6, attributable to commutation of all received signal components, is now missing from the voltage curve 98′ applied to the kinescope. This comes about by way of the fact that the channels 82, 84 and 86 have been designed, in accordance with the present invention, to cut off at frequencies well below the commutating frequency of 2.8 mc. thus preventing any such 2.8 mc. sinusoidal component from being transmitted to the kinescopes. The high frequencies necessary to provide picture detail, of course, are provided through the high-pass picture-detail filter 94, which effectively by-passes the commutator 72. Since the high pass filter 94 will be productive of a small amplitude ringing component 114 at some frequency which is characteristic of the filter, the signal 98′ must be limited in amplitude to a value establishing the peak 116 of the ringing undulation 114 below the blooming level 110 of the kinescope. This obviates possible fuzziness in the image due to beam blooming in the vicinity of any sharp transitions from one light level to another. However, with the mean light level for black signal having its reference at 106′, the mean light level produced by the white signal 98′ will be substantially as indicated at 112′ which is considerably above the prior art mean light level for the white signal 98′ shown in both Figures 6 and 7 at 112. In fact, with the black light level reference at 106′, it can be seen that the improved mean white light level provided by the present invention is substantially twice that of the mean white light level provided by prior art conditions.

Thus, in addition to eliminating the dot structure in the reproduced image due to commutation, the present invention provides a considerable increase in the light level permissibly obtained from the kinescopes without losing image or picture-detail due to beam blooming. With the black level of the kinescope 88, as well as the other kinescopes 90 and 92 being made to always correspond to the black signal level 104′ of their respective channels, such action being easily provided by well known D. C. level setter circuits, adjustment of the bias on the kinescopes 88, 90, and 92 will allow an apportionment of the advantages permitted by the present invention. That is to say, for a given light output produced by prior art arrangements, use of the present invention will permit a much higher image detail to be represented. On the other hand, for a given image detail as produced by prior art conditions, the present invention will allow a much higher light level to be produced in the reproduced color image.

It may, in some instances be desirable, as shown in Figure 11, to incorporate in the picture-detail high pass channel which by passes the commutator, as shown in Figure 5, a rejection characteristic at the commutating frequency. In Figure 11, this is indicated by the block 116 which may be any well-known form of rejection trap adapted to attenuate the 2.8 mc. commutating rate of the time division multiplexing system. This is particularly important in the case where a monochromatic color area is being transmitted. Consider, for example, the conditions existing when an all green area is being transmitted. As shown in Figure 8, the waveform of the transmitted video signal will be determined largely by the green pulses 46 which define a 2.8 mc. sinusoidal component 118. This sinusoidal component 118 will be demodulated and appear at the output of the receiver 60 in Figure 5. Since the picture-detail high pass filter circuit 94 is adapted to pass all frequencies from 1.4 to 4.2 mc., this sinusoidal component 118 will produce a dot pattern throughout the image over such monochromatic areas. If, however, the rejector 116 is placed in series with the picture-detail high pass circuit 94, this 2.8 mc. component will be eliminated thereby preventing the formation of a dot pattern on the kinescope screen. The elimination of this sinusoidal component 118 again permits an increase in the maximum mean green channel light level producible by the kinescope 88 over prior art conditions. This is shown in Figure 9 wherein the signal 98 applied to the green kinescope for this green area condition establishes a mean light level 120 substantially above the prior art mean light levels 112 and for white areas shown in Figures 6 and 7. A transient response component 122 due to the abruptly applied 2.8 mc. signal will of course appear on the signal 98″. Since it can be shown that the amount of green light in a given intensity of white area is much greater than in a plain green area of equal apparent intensity or brilliance, the advantageous operating characteristic of the present invention as shown in Figure 9 will provide a very great relative increase in available light intensity in color areas before losing picture detail due to beam blooming. In practice, however, this amounts to restricting the input signal to the kinescope 88 to where the peak of the signal 98″ defined by the transient 122 is not in excess of the blooming level 110.

Another arrangement for properly mixing the by-passed picture-detail high frequency components with the outputs of the low pass color channels is shown in Figure 10 wherein separate adder circuits 126, 128 and 130 are connected with the respective outputs of the green, red and blue low pass receiver circuits 82, 84, and 86. This permits the high frequency image detail information to be reproduced simultaneously on all three of the green, red, and blue kinescopes 88, 90, and 92 respectively. Since it can be shown that the color sensitivity of the human eye is reduced when viewing small areas corresponding to the image detail, no deleterious effects are imposed on the color balance of the picture by this method while the apparent detail or picture "crispness" may be increased.

It may be noticed that inasmuch as the incoming high frequency components in the receiver of Figure 5 are actually applied to the commutator 72 there will exist conditions permitting the heterodyning of these high frequency components with the commutating frequency of the commutator thereby to produce false low frequency distortion components. The effects of these components may be visually cancelled to a large extent and rendered of nill effect if a suitable type of horizontal interlacing in the image transmitter and receiver is employed. Although horizontal interlace has been heretofore employed to increase the effective definition in the image at the expense of a lower frame presentation rate, it is apparent that with the present system, the highest possible picture detail is already provided through the novel by-passing of the picture detail frequency around the commutator.

Figure 2:
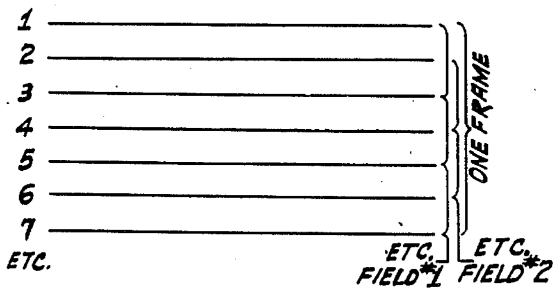
Figure 2 illustrates certain aspects of a line dot-interlace system generally employed by the transmitter of Figure 1.
Figure 3:
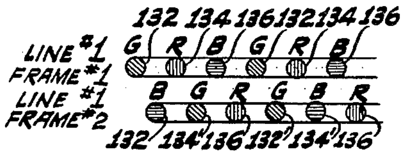
Figure 3 illustrates in further detail the dot-interlace system used in the transmitter of Figure 1.

However, an exemplary form of horizontal interlacing suitable for reducing the visual effects of the distortion components produced by the heterodyning action described is shown and described in full detail in the U. S. patent application by Randall Ballard, Serial No. 117,528, entitled "Color Television System," filed September 24, 1949. For a better understanding of the manner in which these distortion components are visually cancelled, in the present invention there is illustrated in Figure 2 a conventional form of kinescope raster produced by an accepted standard of vertical interlacing, namely, lines 1, 3, 5, and 7, etc. are laid down on the kinescopes 88, 90 and 92 by the first field or vertical scansion of the kinescopes whereas lines 2, 4, 6, etc. will be laid down by the second field or vertical scansion of the kinescopes. To illustrate one form of permissible line interval interlace, Figure 3 indicates the manner in which line 1 of the raster of Figure 2 is scanned over two successive frame intervals. During the first frame and at the beginning of the field 1 of that frame, line 1 is scanned simultaneously in all of the green, red, and blue kinescopes 88, 90 and 92. Hence, considering Figure 3 as a time plot of the sampling intervals comprising line 1 of frame 1 as produced in the receiver 60 of Figure 5, the line is made up of green picture element intervals 132, red picture element intervals 134 and the blue picture element intervals 136. As shown, the individual picture or image element intervals are separated by spaces substantially equal to the duration of a color interval. It is noted that for convenience, the elemental intervals making up the line are shown as circular but, in fact, it is manifest that they would have no real geometric form.

The second time line 1 is scanned which, of course, occurs at the beginning of frame 2, shown in the lower sequence of intervals 132', 134', and 136' and, as described more fully in the above-referenced U. S. patent application by Randall Ballard, the phase of the commutator 10 in the transmitter of Figure 1 and the commutator 72 in the receiver of Figure 5 has been shifted through the simultaneous action of the interlacing oscillators 34 and 63 in the transmitter and receiver respectively. This interlacing oscillator operates at approximately one-half line frequency and accomplishes a shift of virtually 180° so that the color intervals of the second scansion of line 1 at the beginning of frame 2 (shown at the bottom of Figure 3) will occur during the spaces between the color intervals set forth along line 1 at the beginning of frame 1 (shown in the upper portion of Figure 3). It is then found that the distortion components produced by the heterodyning action described above tend to occur on either side of the color picture intervals so that interpositioning of the interlaced elements provides partial cancellation of the lower frequency disturbance. The phase of such low frequency disturbances can in turn be shown to allow this effect to take place to a degree permitting considerable reduction of any visual interference produced by these false low frequency components.

In the practice of the present invention, it is sometimes desirable to increase the commutating sampling rate of the time multiplexing system in order to make any trace of dot pattern in color receivers or black and white receivers less noticeable and objectionable. A transmitter for increasing this rate is by way of example shown in Figure 12 and is in every respect the same as the transmitter described in Figure 1 with the exception of a higher sampling rate for the commutator, a corresponding alteration in the frequency characteristics of the circuits employed and a change in the output to adder circuit 56. Due to the similarity to Figure 1, like circuit elements have been assigned similar reference numerals followed by the subscript "*a*." Since the sampling rate in the arrangement of Figure 12 is increased to 3.8 mc. it is permissible to increase the low pass circuits 12*a*, 14*a*, and 16*a* to above 1.4 mc. In this case, the highest pulse frequency faithfully representable by a sampling rate of 3.8 mc. would be one-half of 3.8 mc. or 1.9 mc. Correspondingly, the channels 12*a*, 14*a* and 16*a* handling the output of the green, red, and blue cameras 18*a*, 20*a* and 22*a* have been indicated as having a channel width of 0–2 mc. The picture-detail high pass circuit 58*a* will of course be given a corresponding bandpass of 2–3.5 mc. In the case of the transmitter of Figure 12, a further alteration is made over Figure 1 in that the adder circuit 56 receives color signals only from the green and red color channels. This is permissible since the eye is less sensitive to blue color components than to green and red color components so that the detail reproduced in the image may be adequately defined by information from only the green and red channels.

Figure 13:
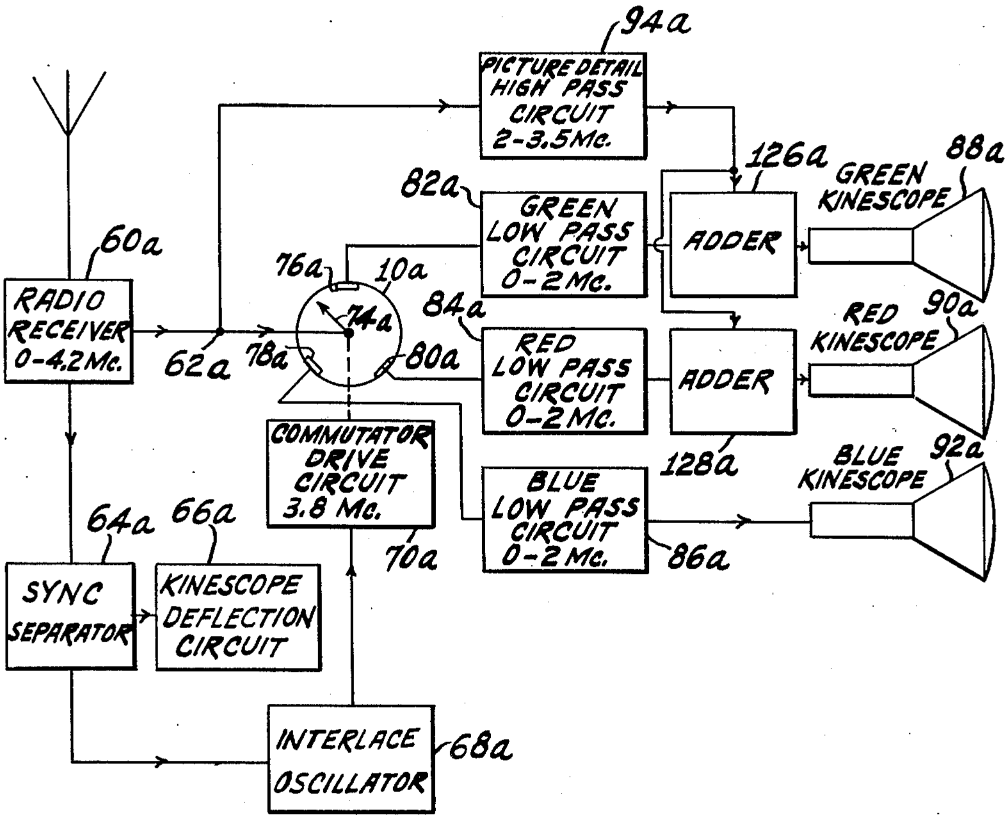

The corresponding receiver for the transmitter of Figure 12 is shown in Figure 13. This receiver is again substantially the same as the receiver of Figure 5 with the exception of certain changes in the bandpass of the picture detail and green, red and blue receiver channels, as well as an increase in the commutating rate from 2.8 mc. to 3.8 mc., and the use of a further adder circuit. In Figure 13 like elements have been given the same numerical designation as in Figure 5 but now followed by the subscript "*a*." It will be noted that the receiver of Figure 13 is adapted to combine the picture-detail signal passed by the circuit 94*a* with the signals applied to both the green and red kinescopes 88*a* and 90*a* by means of the adder circuits 126*a* and 128*a*. Furthermore, the picture-detail high pass circuit 94*a* has been restricted in the bandpass to 3.5 mc. which, as described in connection with Figure 9, tends to discourage the production of dot pattern which could otherwise be due to 3.8 mc. video components corresponding to the commutation rate.

In some respects the use of the higher commutation rate is convenient in that it allows a much simpler construction of the picture-detail high pass circuit, there now being no need for a rejection characteristic per se. However, it will be recognized that a certain amount of cross-talk must be tolerated with this higher commutating rate because of the restricted transmitter video bandwidth of 4.2 mc. As pointed out above, it is well known that the highest pulse frequency communicable over a given channel without producing cross-talk is well known to be twice the bandwidth of the channel over which the pulses are to be communicated. Thus, with the 3.8 mc. sampling rate, the actual pulse rate delivered at the output of the transmitter commutator 10a in Figure 12 will be three times 3.8 or 11.4 mc., half of which would be 5.7 mc. which of course is in excess of the 4.2 mc. bandwidth provided by the transmitter.

It is to be further understood that although the lower frequency limits of the bandpass circuits shown in the above-described embodiments of the present invention have been indicated as zero cycles per second, this lower frequency limit will, in practice, be in the order of 60 cycles or so. Zero cycle response, corresponding to direct-coupled amplifier circuit action, may be simulated through the use of well-known direct-current restoration arrangements for the video channels. Moreover, although the symbolic representations of the time multiplexing transmitter commutator device and receiver signal distributing commutating device used in the above description of the present invention is suggestive of a mechanical arrangement, it will be understood that such commuation arrangements may take a variety of well-known forms, either mechanical or electronic. Inasmuch as rather high signal sampling or commutation rates are involved, it is evident that the signal sampling is best accomplished by electronic means, examples of which in addition to a particular arrangement for obtaining line element interlace is shown and described in the above-referenced U. S. patent application by Randall Ballard, Serial No. 117,528, filed September 24, 1949, entitled "Color Television Systems." Other suitable signal commutation arrangements for time division multiplexing in accordance with the present invention are shown and described solely by way of example in U. S. Patent No. 2,048,081, issued July 21, 1936, to Alger S. Riggs, entitled "Communication Systems," and also in U. S. Patent No. 2,041,245, issued May 19, 1936, to P. M. Haffcke, entitled "Wave Signalling Method and Apparatus." It is to be understood that it may, in certain instances, be desirable to modify these exemplary commutation arrangements to more completely serve the interests of the present invention, but such modifications are well within the scope of those skilled in the art.

Having thus described my invention, what is claimed is:

1. In a television receiver the combination of, a source of intelligence signal divisible into high and low frequency components, a signal channel adapted to pass predetermined low frequency signal components and attenuate predetermined high frequency signal components, means for coupling intelligence signal to the input of said signal channel, means connected with said coupling means for periodically interrupting the application of intelligence signal to said signal channel at a predetermined rate, means connected with said intelligence signal source for extracting high frequency components therefrom, a signal adding means, and connections applying both the output of said signal channel and said high frequency signal extracting means to the input of said adding means for combining in the output thereof.

2. In a television receiver the combination of, a source of intelligence signal divisible into high and low frequency components, a plurality of signal channels each adapted to pass predetermined low frequency signal components and discriminate against predetermined high frequency signal components, a signal distributing apparatus having an input terminal and a separate output terminal for each of said signal channels, means for coupling said input terminal to the output of said source of intelligence signal, said signal distributing apparatus being adapted to periodically and sequentially channel its input terminal signal to all of said separate output terminals, coupling between each of said signal distributing apparatus output terminals and the input of a respectively different one of said signal channels, frequency discriminative means connected with said intelligence signal source for extracting and passing the high frequency components therefrom, a signal adding circuit having a plurality of inputs and at least one output, and connections for applying both the output of said frequency discriminative means and the outputs of at least one of said signal channels to respective adding circuit inputs.

3. Apparatus according to claim 2 wherein said television receiver is of the time division multiplex variety wherein said intelligence signals comprise a series of grouped pulses, the amplitude variations of each of the separate pulses of a given group corresponding to a different type of signal intelligence and wherein the switching action of said signal distributing apparatus is held in synchronism with the occurrence of said pulses whereby pulses representing substantially only one type of signal intelligence is distributed to a particular signal channel.

4. Apparatus according to claim 3 wherein there is additionally provided a frequency rejection circuit adapted to attenuate signals having a frequency value substantially equal to the pulse recurrence rate delivered to a given signal channel by said distributing apparatus, and means for connecting said rejection circuit with said frequency discriminative means whereby to attenuate those signals applied to said adder circuit having a frequency corresponding to the rejection frequency of said rejection circuit.

5. Apparatus according to claim 3 wherein said frequency discriminative means is adapted to highly attenuate frequencies in excess of the pulse recurrence rate delivered to a given signal channel by said distributing apparatus.

6. Apparatus according to claim 3 wherein the lowest frequency discriminated against by at least one of said signal channels is made substantially equal to the lowest frequency passed by said frequency discriminative means.

7. In a television receiver the combination of a source of intelligence signal divisible into high and low frequency components, a plurality of signal channels each adapted to pass predetermined low frequency signal components and discriminate against predetermined high frequency signal components, a signal distributing apparatus having an input terminal and a separate output terminal for each of said signal channels, said signal distributing apparatus being adapted to periodically and sequentially channel its input terminal signal to all of said separate output terminals at a given frequency, a coupling between each of said signal distributing apparatus output terminals and the input of a respectively different one of said signal channels, frequency discriminative means connected with said intelligence signal source for attenuating said given frequency and passing the high frequency components of said intelligence signal, a plurality of signal adding circuits each having a plurality of inputs and at least one output, connections applying the output of at least one of said signal channels to one of the inputs of a respective signal adding circuit, and connections applying the output of said frequency discriminative means with another input of at least some of said signal adding circuits.

8. In a color television receiver employing a plurality of color channels and wherein there is employed a color signal comprising a series of grouped pulses the amplitude variations of each of the separate pulses of a given group corresponding to color information of a different color channel, the color signal being divisible into high and low frequency components, the combination of, a color signal supply terminal, a plurality of signal channels corresponding to the color channels of the color television system, each channel being adapted to pass predetermined low frequency signal components and discriminate against predetermined high frequency signal components, a signal distributing apparatus having an input terminal and a separate output terminal for each of said signal channels, said signal distributing apparatus being adapted to periodically and sequentially execute switching of its input terminal to all of said separate output terminals, coupling between each of said signal distributing apparatus output terminals and the input of a respectively different one of said signal channels, means for coupling color signal from said supply terminal to the input of said signal distributing apparatus, a high-pass filter circuit having its input connected with said color signal supply terminal, said filter circuit being adapted to pass only predetermined frequency components of said color signal, a signal adding circuit having a plurality of input paths and at least one output path. connections for applying the outputs of both said high-pass filter circuit and at least one signal channel to respective input paths of said signal adding circuit for combining in the output path thereof, and means for applying the combined signal produced in said adding circuit output path to the input of a beam intensity modulating circuit for a cathode ray image reproducing tube.

9. Apparatus according to claim 8 wherein there is additionally provided a frequency rejection circuit adapted to attenuate signals having a frequency value substantially equal to the pulse recurrence rate delivered to a given signal channel by said distributing apparatus and means for connecting said rejection circuit with said high pass filter circuit whereby to attenuate those signals applied to said adder circuit having a frequency corresponding to the rejection frequency of said rejection circuit.

10. In a color television radio receiver adapted to receive and demodulate a composite signal including a synchronizing component and a color component, said color component comprising a series of grouped pulses having low and high frequency components, the amplitude variations of each of the separate pulses constituting a group corresponding to intensity variations of a different one of a predetermined number of image color components, the timing of said pulses being reflected in the nature of said synchronizing component, the combination comprising, a supply terminal bearing demodulated color signal, a signal distributing apparatus having an input path connected with said color signal supply terminal and a plurality of output paths equal in number to the number of pulses in each pulse group of the composite signal color component, said distributing apparatus being adapted to periodically and sequentially execute switching of its input path to all of its output paths in accordance with demodulated composite signal synchronizing component whereby signal variations at a given output path represents corresponding intensity variation of a given image color component, a separate color signal channel connected with each of the output paths of said signal distributing apparatus, each channel being restricted in bandwidth to pass only low frequency signal components, a high pass filter circuit having its input connected with said supply terminal, a signal combining circuit having its input paths connected with both the output of at least one of said color signal channels and the output of said high pass filter circuit for combining the signals therefrom, and means for applying the combined signal of said signal combining circuit to the input of a beam intensity modulating circuit for a cathode ray image reproducing tube.

11. Apparatus according to claim 10 wherein color components represented by the composite signal color component are green, red and blue components and wherein said signal combining circuit is connected in that color signal channel handling green color information.

12. Apparatus according to claim 10 wherein the color component of the color signal is of the dot-interlace variety so that predetermined color pulse groups are combined to form information units defining the color representations for successive line scansions by an image reproducing cathode ray tube, the time phase of predetermined information units being altered relative to one another in accordance with a related schedule which schedule is reflected in the synchronizing component of said composite signal and wherein said high-pass filter circuit is so designed that the lowest frequency passed thereby is substantially equal to but above the highest frequency passed by the restricted bandwidth of said color signal channels whereby distortion components resulting from signal distribution are visually cancelled in the reproduced dot interlace color television image.

13. Apparatus according to claim 12 wherein there is additionally provided a frequency rejection circuit adapted to attenuate signals having a frequency value substantially equal to the pulse recurrence rate delivered to a given signal channel by said distributing apparatus and means for connecting said rejection circuit with said high pass filter circuit whereby to attenuate those signals applied to said signal combining circuit having a frequency corresponding to the rejection frequency of said rejection circuit.

14. Apparatus according to claim 12 wherein said high-pass filter circuit is designed to highly attenuate frequencies in excess of the pulse recurrence rate appearing at a given output path of said signal distributing apparatus.

15. In a television receiver the combination of, a source of intelligence signals divisible into a low frequency range and a high frequency range, an electrical signal channel having input and output terminals, said channel being adapted to pass said low frequency range and discriminate against said high frequency range, means for coupling intelligence signal variations to the input of said signal channel, said coupling means including means for periodically interrupting the application of intelligence signal variations to said signal channel at a predetermined rate, a signal adding means, connections from said signal channel output terminals to said signal adding means, and connections from said source of intelligence signals to said signal adding means for algebraically combining the interrupted and frequency discriminated version of said intelligence signal with the high frequency portion of a non-interrupted version of said intelligence signal to form a composite intelligence waveform.

16. In a color television receiver employing a plurality of color channels and wherein there is employed a color signal comprising a series of grouped pulses the amplitude variations of each of the separate pulses which constitute a group corresponding to intensity variations to a different one of a predetermined image color component, an image reconstructing system comprising in combination, means for time dividing the color signal into its component pulses, means for combining all pulses representing a given image color component into separate color components signals, means for filtering each color component signal to attenuate predetermined high frequency components thereby to form sets of low-detail color component signals, means for selecting predetermined high frequency components from the color signal before time division thereof, means for combining the selected high frequency color signal components with at least one of the separate sets of color component signals to form at least one set of high detail color component signals, and means for modulating the beam intensity of separate cathode ray image reproducing tubes with each set of high detail color component signals and with each of some sets of low detail color component signals.

17. In a color television receiver employing a plurality of color channels and wherein there is employed a color signal comprising, a series of grouped pulses the amplitude variations of each of the separated pulses of a given group corresponding to color information of a different color channel, the color signal being further divisible into a first and second range of frequency components, the combination of a color signal supply terminal for delivering the color signal, a plurality of signal channels corresponding to the color channels of the color television system each channel being adapted to communicate only said first frequency range, a signal distributing apparatus having an input terminal and a separate output terminal for each of said channels, said signal distributing apparatus being adapted to periodically and sequentially execute switching of its input terminal to all of said separated output terminals, coupling between each of said signal distributing apparatus output terminals and the input of a respectively different one of said signal channels, means for coupling color signal variations from said supply terminal to the input terminals of said signal distributing apparatus, a color television image reproducing means having a plurality of primary input terminals adapted to receive color channel information and at least one secondary terminal adapted to receive un-interrupted signal variations from said color signal supply terminal, a connection from the output of each signal channel to a respective one of said primary input terminals, and a connection from said signal supply terminal and the said secondary input terminal.

18. In a color television system employing a plurality of color channels, each channel being divisible into different ranges of signal frequency components, the combination of a first means for cyclically varying the transmission during sampling intervals of predetermined frequency one frequency range of each color channel to produce color information signals, and means connected with the output of said sampling means and at least one of said color channels for combining the color information signals with signals representing unsampled information from at least one color channel, means for transmitting the signals, and means for receiving the signals, said receiving means including a second means for cyclically varying the transmission operating substantially at the same frequency as the first means for cyclically varying the transmission at the transmitter to obtain from the transmitted sampled color information signal separate sets of color information signals, devices for utilizing said separate sets of color information signals, and connections for bypassing around the receiver sampling means and to at least one of the utilization device signals representing transmitted unsampled information.

19. In a color television receiver wherein the transmitted intelligence signal is derived by adding at least the high frequency components of different primary colors together to form an image detail signal, modulating the phase and amplitude of a color carrier in accordance with the relative amplitudes of the low frequency components of the color signals, and adding the modulated color carrier to the image detail signal to form a composite wave, apparatus for effectively recovering the image detail signal and the color information represented by the color carrier comprising in combination a source of alternating current waves having a predetermined phase relationship with respect to said color carrier, means for deriving different phases of said waves, means for modulating each phase of said waves with said composite wave and for extracting only those products of modulation produced by the high frequency portion of said composite wave, and an adder having two inputs and an output, one of said inputs being coupled to the output of one of said modulating means, and a bypass channel coupled so as to conduct at least the high frequency portion of said composite signal to the other input of said adder.

References Cited in the file of this patent

UNITED STATES PATENTS

| Number | Name | Date |
|---|---|---|
| 2,041,245 | Haffcke | May 19, 1936 |
| 2,048,081 | Riggs | July 21, 1936 |
| 2,272,638 | Hardy | Feb. 10, 1942 |
| 2,333,969 | Alexanderson | Nov. 9, 1943 |
| 2,335,180 | Goldsmith | Nov. 23, 1943 |
| 2,359,637 | Goldsmith | Oct. 3, 1944 |
| 2,461,515 | Bronwell | Feb. 15, 1949 |
| 2,554,693 | Bedford | May 29, 1951 |
| 2,558,489 | Kalfaian | June 26, 1951 |